United States Patent [19]
Luzzi

[11] Patent Number: 5,114,357
[45] Date of Patent: May 19, 1992

[54] HIGH VOLTAGE ELBOW

[75] Inventor: Glenn Luzzi, Mt. Bethel, Pa.

[73] Assignee: Amerace Corporation, Hackettstown, N.J.

[21] Appl. No.: 692,587

[22] Filed: Apr. 29, 1991

[51] Int. Cl.⁵ .......................................... H01R 13/53
[52] U.S. Cl. .................... 439/183; 439/805; 439/921
[58] Field of Search ............ 439/921, 181, 183–187, 439/805; 174/152 R

[56] References Cited
U.S. PATENT DOCUMENTS

| | | | |
|---|---|---|---|
| 3,883,208 | 5/1975 | Sankey et al. | 439/921 |
| 4,202,591 | 5/1980 | Borgstrom | 439/185 |
| 4,722,694 | 2/1988 | Makal et al. | 439/181 |

FOREIGN PATENT DOCUMENTS 1444767  8/1976  United Kingdom ............... 439/921

Primary Examiner—Gary F. Paumen
Attorney, Agent, or Firm—Lerner, David, Littenberg, Krumholz & Mentlik

[57] ABSTRACT

A connector for connecting a high voltage electrical cable to a high voltage electrical terminal. A generally L-shaped elbow housing of a resilient insulating material with a central bore therethrough provides a cable receiving leg and a terminal receiving leg. A fastening means captivated within the terminal receiving leg, but free to rotate, is operated by an external tool inserted through a selectively capped access to join a terminated high voltage cable inserted through the closely fitting bore of the cable receiving leg to a terminal inserted in the terminal receiving leg. The fastening means engaging its captivating lock acting to assist in the assembly or disassembly of connector to said terminal.

8 Claims, 4 Drawing Sheets

HIGH VOLTAGE ELBOW

BACKGROUND OF THE INVENTION

1. Field of the Invention

The invention is directed to the field of connecting and disconnecting high voltage electrical cables to high voltage electrical terminals and, more particularly, to the connection and disconnection of large, heavy high voltage electrical cables onto transformers, switch gear and the like.

2. Description of the Prior Art

Prior art techniques for connecting large, heavy high voltage cables used in 600 Amp electrical systems employed a standard T-shaped connector 10 as is shown in FIG. Connector 10 had a high voltage electrical cable receiving leg 12 into which a high voltage electrical cable 14 was inserted. At one end of cable 14 a terminator or electrical crimp connector 16 was placed. Crimp connector 16 was coupled to the bared central conductor of cable 14 by crimping crimp barrel 18 of connector 16 to such bared conductor as is well known in the art. Connector 16 also includes a lug 20 through which extends an internally threaded aperture 22.

Connector 10 further comprises an electrical terminal receiving leg 24 which includes a receptacle 26 contoured to mate with high voltage terminal 28. Terminal 28 which could be a transformer bushing or switch gear bushing or the like is mounted upon a support 30 which can be a wall of the enclosure for such equipment. Terminal 28 is made of a shell 32 of epoxy or similar insulating material and contains a core 34 of metal with an internally threaded aperture 36 therein.

A third leg 38, aligned with electrical terminal receiving leg 24 also contains a receptacle 40 and is the mirror image of leg 38 and the connector 10 could be rotated so that leg 38 can be employed as a terminal receiving leg if desired. The central bore of leg 12 communicates with receptacles 26 of leg 24 and 40 of leg 38 such that the threaded aperture 22 of lug 20 can be inserted into the jointure of receptacles 26 and 40 when cable 14 is fully positioned in leg 12.

A fastening means in the form of dead plug 42 is used to join high voltage electrical cable 14 to terminal 28. Plug 42 has a body shell 44 fabricated of insulating material and a metal core 46 with an externally threaded portion 48 at one end and a voltage test point 50 at the other. To fasten cable 14 to terminal 28, the cable 14 with terminator 16 installed is placed into the bore of cable receiving leg 12 and advanced until the lug 20 enters the jointure between receptacles 26 and 40 and threaded aperture 22 is aligned with the central axis of receptacles 26 and 40. Plug 42 is now introduced into leg 38 and rotated by a tool (not shown) applied to test point 50. Externally threaded portion 48 engages first internally threaded aperture 22 of lug 20 and then internally threaded aperture 36 of terminal 28. As the plug 42 gets closer to its final assembly position, the engagement of the outer surface of the insulating body shell 44 and the inner surface of receptacle 40 produce a great deal of resistance and friction making assembly and later disassembly difficult. Further, the externally threaded portion 48 offers no assistance in assembling the connector 10 to terminal 28 or in its later disassembly.

Since voltage test point 50 may be hot because of its direct connection to the high voltage cable 14, an insulating cap 52 is used. Because the shield is interrupted to provide access to the test point 50, a cap 52 of semi-conductive elastomeric material such as EPDM with carbon black is employed. Cap 52 fits over the outer surface of leg 38 and is installed by the engagement of a hot stick (not shown) with the ring 54. Cap 52 is removed when plug 42 is to be installed or removed or when it is desired to probe the test point 50 to determine the presence of a voltage at the cable 14 and/or terminal 28. Alternatively, instead of the dead plug 42 a load break tap reducing plug LTRP (not shown) or other similar device could be employed.

To permit the cable receiving leg 12 to receive a wide range of cable diameters, it was common to make the diameter of the bore large enough to handle the diameter of the largest terminator 16 required for the largest diameter cable to be used with the connector 10. Then a cable adapter was used to match the outside diameter of the cable to be used with the inside diameter of the bore of the cable receiving leg 12. This required that a large number of cable adapters be available and increased the possibility of the introduction of dirt and other contaminants into the connector because of the two interfaces, one between the cable surface and the bore of the cable adapter and a second between the surface of the cable adapter and bore of the cable receiving leg 12. Further, since plug 42 and connector 10 were separate, assembly of the threaded portion 48 of plug 42 into threaded aperture 36 of terminal 28 did not assist in the assembly of connector 10 to terminal 28 until plug 42 was almost completely seated and did not assist at any time in the disassembly of connector 10 from terminal 28.

SUMMARY OF THE INVENTION

The present invention overcomes the difficulties noted above with respect to the prior art devices by providing a connector for connecting a high voltage electrical cable to a high voltage electrical terminal in the form of an L-shaped elbow of insulating material which has a cable receiving leg and a terminal receiving leg at right angles to one another. A fastening means, free to rotate, is captivated within the bore of the terminal receiving leg, acts upon the connector to assist in assembling the connector, with cable inserted, to the terminal or removing same, depending upon the direction of rotation of the fastening means. The diameter of the cable terminator is reduced so that the cable receiving leg can conform to the outer diameter of the cable without the need for cable adapter which minimizes the number of interfaces present reducing the possibility of introducing dirt, moisture or contaminants into the connector system. It is therefore an object of this invention to provide an improved connector for joining a high voltage electrical cable to a high voltage electrical terminal.

It is another object of this invention to provide an improved connector for joining a high voltage electrical cable to a high voltage electrical terminal employing a captivated, freely rotatable fastener.

It is another object of this invention to provide an improved connector for joining a high voltage electrical cable to a high voltage electrical terminal employing a captivated, freely rotatable fastener manipulated form outside of the connector.

It is still another object of the invention to provide an improved connector for joining a high voltage electrical cable to a high voltage electrical terminal employing a cable receiving cavity that conforms to the cable diameter without cable adaptors and minimizes the number of interfaces present.

It is yet another object of the invention to provide an improved connector for joining a high voltage cable to a high voltage terminal employing an externally operated fastening means permanently coupled to the connector itself.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters.

DESCRIPTION OF THE PREFERRED EMBODIMENT

Figure 2:
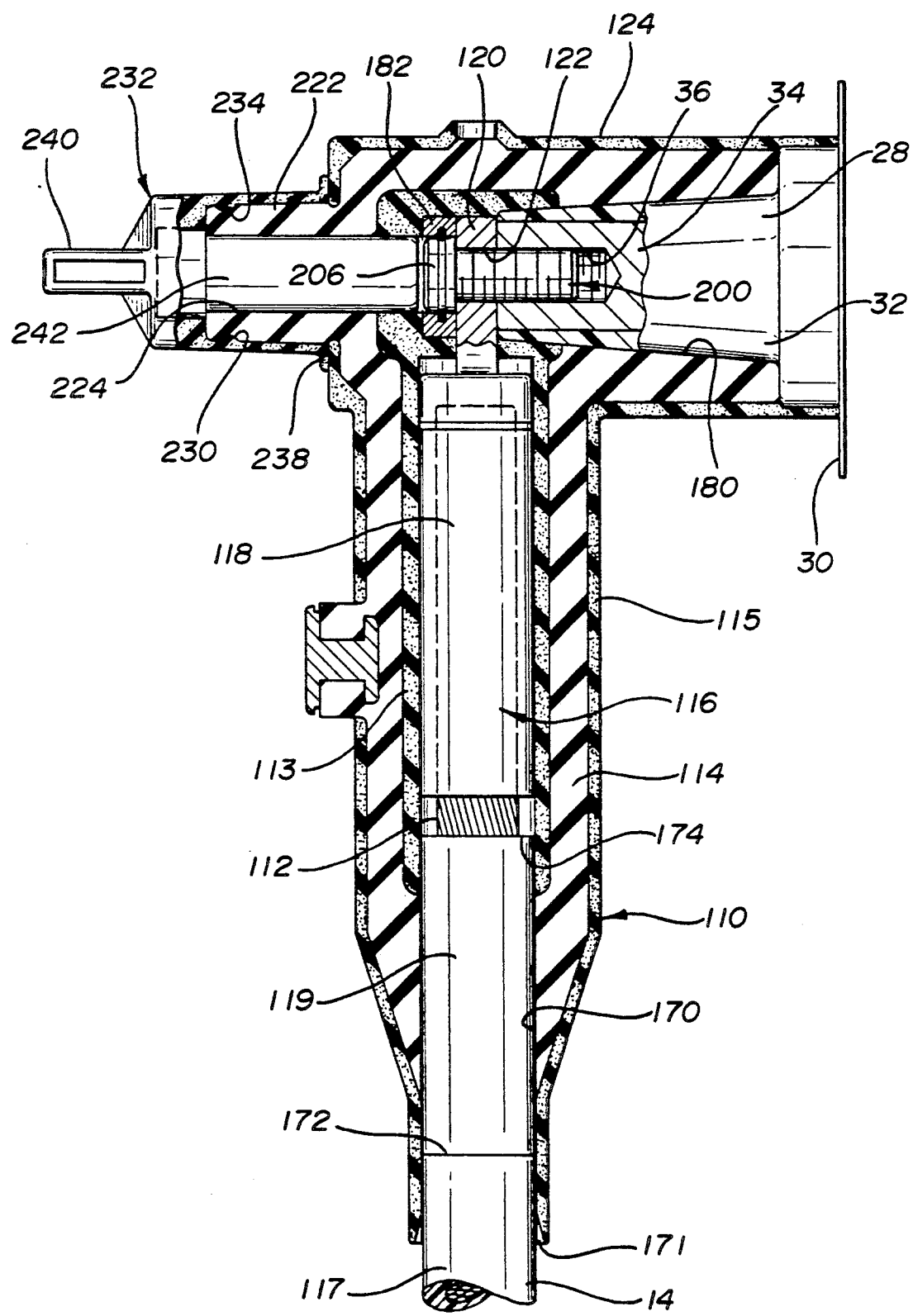
FIG. 2 is a side elevation, partly in section, of a cable connector for coupling a high voltage electrical cable to a high voltage terminal according to the concepts of the present invention.

Turning now to FIG. 2, there is shown a connector 110 constructed in accordance with the concepts of the invention. Connector 110 is a generally L-shaped elbow connector having a depending cable receiving leg 112 and a transverse terminal receiving leg 124. Connector 110 is made of a body portion 114 of insulating material such as natural or synthetic rubber and preferably may be an elastomeric material such as EPDM rubber. Body portion 114 is covered with a shield layer 115 of conductive natural or synthetic rubber and preferably an elastomeric material such as EPDM rubber to which carbon black has been added to make layer 115 semiconductive.

A central bore 170 extends through leg 112 to receive therein the high voltage electrical cable 14 to be connected to high voltage electrical terminal 28. The cable shield layer 117 extends to line 172, the cable insulation layer 119, after the outer shield layer 17 had been partially removed, would extend to line 174 and the bared central conductor 121, after the insulating layer 119 had been removed, would extend into the crimp barrel 118 of terminator 116.

Figure 6:
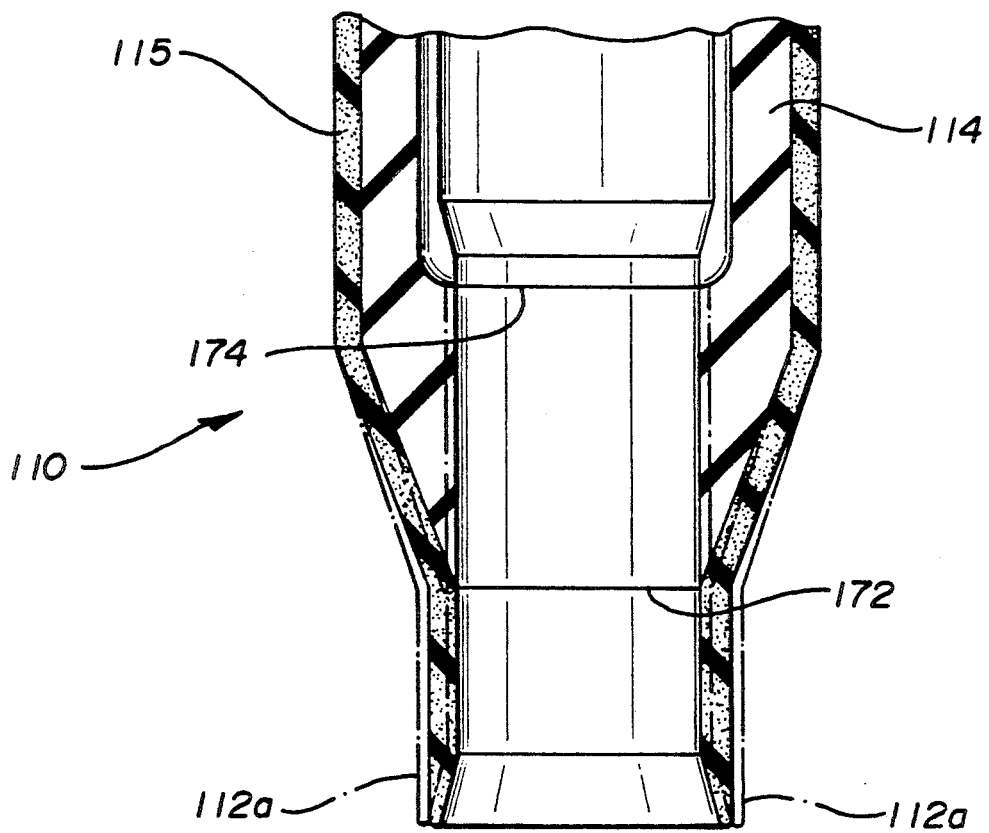
FIG. 6 is a fragmentary side elevation, partly in section, of the open end of the cable receiving leg of the cable connector of FIG. 2.

Because the wall thickness of body portion 114 is decreased between the planes of lines 172 and 174 (see FIG. 6), and only the outer shield 115 is present between the plane of line 172 and the connector entry at line 171, the body 114 is able to flex about a nominal central position as shown by the solid lines to the position 112a as shown by the dotted lines in FIG. 6 to accept a high voltage electrical cable of larger diameter. Body portion 114 would flex to a more inward position if a cable of smaller diameter was introduced into the cable receiving leg 112. In this manner, leg 12 more closely conforms to the cable diameter without the requirement for cable adaptors.

Terminal receiving leg 124 has a receptacle 180 formed therein to match the contour and mate with high voltage terminal 28. The central bore 170 of leg 112 communicates with receptacle 180 of leg 124 so that the internally threaded aperture 122 of lug 120 can be positioned adjacent the front face of terminal 28.

Figure 3:
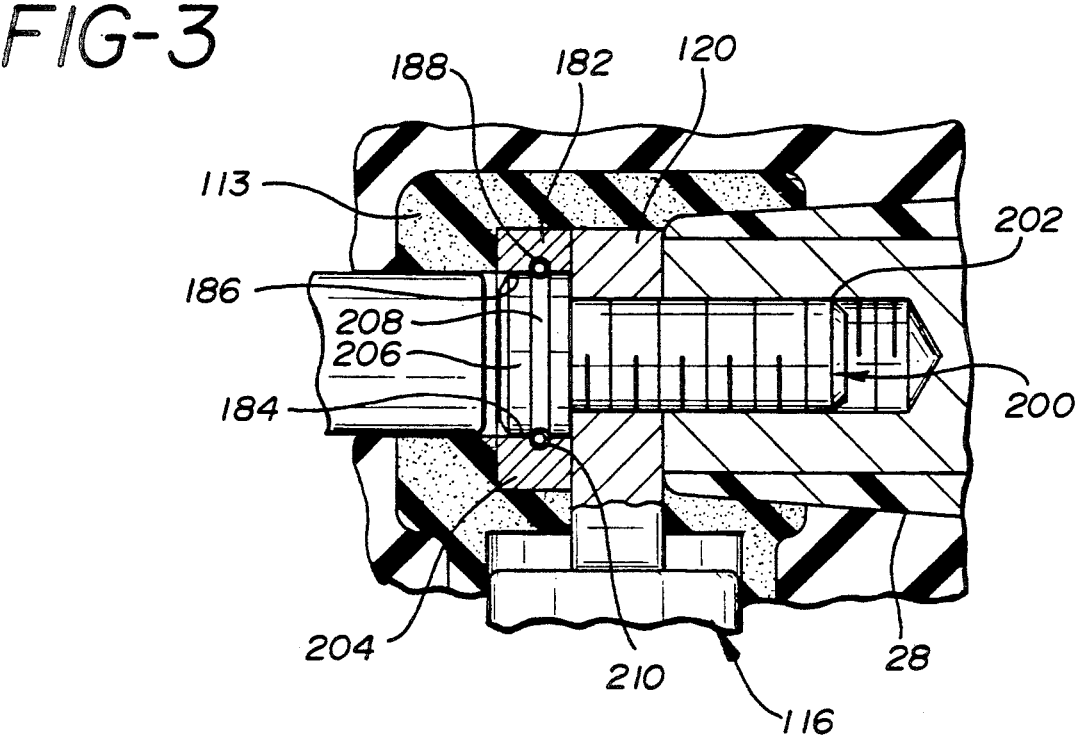
FIG. 3 is an enlarged fragmentary side elevation, in section, of the fastener portion of the connector of FIG. 2.

Molded within the inner shield 113 adjacent the end of bore 170 and the closed end of receptacle 180 is an annular ring 182 with a central bore 184 therethrough aligned with internally threaded aperture 36 of terminal 28 when connector 110 is placed upon terminal 28 as shown in FIG. 2. As is best seen in FIG. 3, the walls 186 defining the bore 184 have an annular recess 188 extending inwardly from the bore 184 and arranged to be aligned with annular recess 208 in the enlarged head portion 206 of bolt 200. Bolt 200, having an externally threaded portion 202 remote from enlarged head portion 206 is intended to threadably mate with the internally threaded bore 122 of lug 120 and then engage internally threaded aperture 36 of terminal 28 to unite the connector 110, the cable 114 via terminator 116 and terminal 28.

Figure 4:
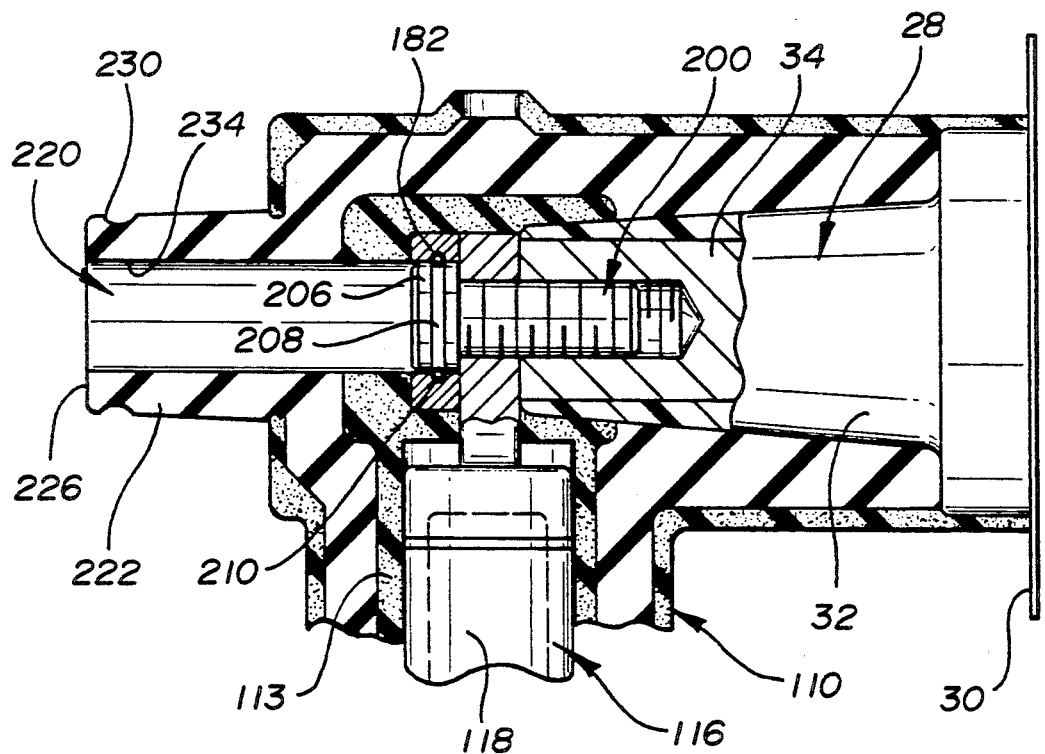
FIG. 4 is a fragmentary side elevation, partly in section, of the cable connector of FIG. 2 with the access cap removed.

Formed opposite the receptacle 180 is an access 220, as shown in FIGS. 2 and 4, formed by outwardly extending the body portion 114 to provide a projection 222 of insulating elastomeric material. A bore 224 (see FIG. 4) extends from remote end 226 through internal shield 113 up to and in communication with bore 186 of annular ring 182. Bores 224 and 186 are of substantially the same diameter and aligned with one another.

To seat bolt 200 in annular ring 182, the bolt 200 is introduced, threaded portion 202 first into bore 224 and advanced so that enlarged head portion 206 comes to rest within bore 186. A split ring 210 or similar locking element is placed in annular recess 208 and held in its compressed state by the close spacing between the exterior diameter of enlarged head portion 206 of bolt 200 and the diameter of bores 224 and 186. When annular recess 208 is aligned with annular recess 188 in ring 182, the split ring 210 is permitted to expand into recess 188 locking bolt 200 to ring 182. Since split ring 210 is partially in each of the recesses 188 and 208, bolt 200 is free to rotate with respect to ring 182, but will move the ring 182 along the longitudinal axis of bolt 200 depending upon the direction bolt 200 is turned. A suitable tool (not shown) may be inserted via bore 224 into a socket (not shown) in enlarged head 206, in a manner well known to advance or retrograde the bolt 200.

Figure 5:
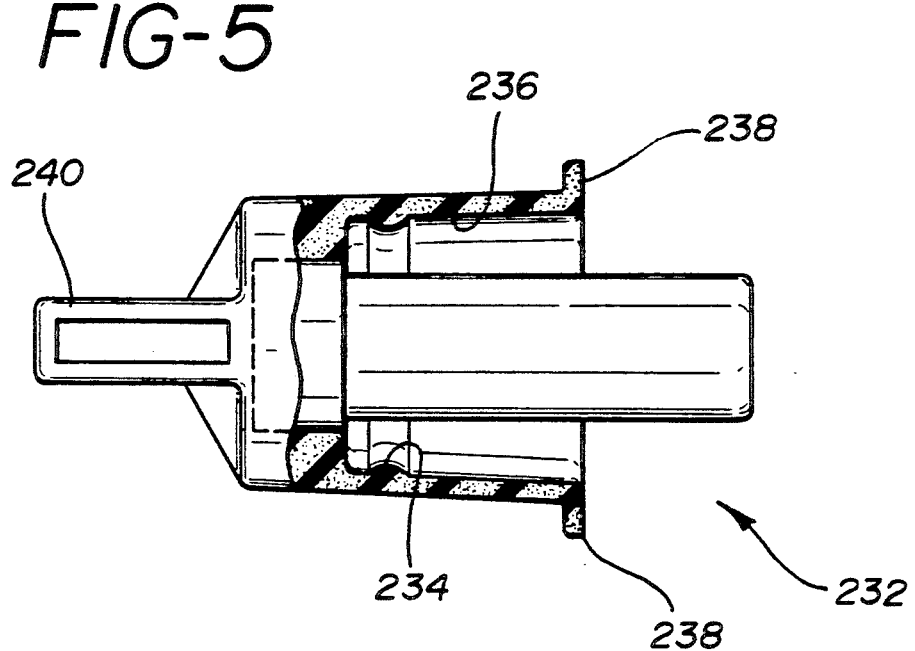
FIG. 5 is a side elevation, partly in section, of the access cap of the cable connector of FIG. 2.

An annular recess 230 is formed in the outer surface of projection 222 adjacent end 226. Recess 230 receives an annular rib 234 on the inner surface of the bore 236 of cap 232 (see FIG. 5) fabricated from semi-conductive elastomeric material. When cap 232 is in place upon projection 222 with annular rib 234 in annular recess 230, the continuity of the shield 115 is re-established. The free ends 238 of cap 232 are turned outwardly from the longitudinal axis of cap 232 to engage shield layer 115 at the base of projection 222. Formed remote from free ends 238 is a pull ring 240 which may be engaged by a hot stick to install or remove cap 232 from projection 222. Extending within bore 236 is a cylindrical plug 242 of hard insulating material having a dielectric constant approximately equal to that of body material 114 and of an external diameter larger than bore 224. Accordingly, when plug 242 is forced into bore 223 (see FIG. 2) the bore is dilated and caused to tightly grip the plug 242 to re-establish the integrity of the insulation 114.

To use connector 110 of FIG. 2, the cable 14 is prepared to expose the proper portions of outer shield 117, insulator 119 and bare central conductor 121. The bared conductor is inserted into the crimp barrel 118 of terminator 116 and the barrel 118 and conductor 121 are compressed by suitable crimping tools and dies as is well known in the art. Terminated cable 14 is then inserted into bore 170 of cable receiving leg 112 of connector 110 from which cap 232 has been removed from access 220. When threaded aperture 122 of lug 120 is in line with bore 224 of projection 222, bolt 200 is introduced with threaded portion 202 first and split ring 210 compressed. The bolt 200 is advanced by a tool engaging the socket in enlarged head 206 of bolt 200 until bolt 200 encounters lug 120, at which point the bolt 200 is rotated so threaded portion 202 engages and threads upon internally threaded aperture 122 of lug 120.

Threaded advancement of bolt 200 continues until recess 208 is aligned with recess 188 in ring 182 and split ring 210 opens to lock bolt 200 and ring 182 together. At this point, the cable 14 and the connector 110 are permanently assembled.

The connector 110 with cable 14 attached is now moved to the terminal 28 and terminal 28 is placed into receptacle 180 of leg 124. The continued rotation of bolt 200 has two effects. Firstly, bolt 200 threaded portion 202 engages internally threaded aperture 36 to unite the connector 110/cable 14 to the terminal 28, but also helps pull the connector 110/cable 14 into assembly with terminal 28. Since neither the connector 110 or the terminal 28 must rotate, nor is there a requirement for a rotating plug as was true of the prior art, a low friction assembly is possible with only linear engagement of the connector 110 with terminal 28. The rotation of captivated bolt 200 assists in moving the connector 110/cable 14 assembly into engagement with terminal 28. In a similar fashion, when bolt 200 is turned in the opposite direction there will be a linear separation as the connector 110/cable 14 assembly is pulled from contact with terminal 28.

Once the cable 14/connector 110 are fastened upon terminal 28 and the tool is withdrawn, cap 232 is installed by use of a suitable hot stick. The plug 242 re=establishes the insulation value of body 114 and the shield layer is restored by the semi-conductive body of the cap 232 itself.

While there have been shown and described and pointed out the fundamental novel features of the invention as applied to the preferred embodiment, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A connector connecting a high voltage electrical cable to a high voltage terminal comprising:
   an elongate body portion of resilient insulating material having a first end and a second and a central bore extending therethrough from said first end to said second end;
   a leg portion of resilient insulating material having a first end and a second end and a central bore extending from said first end to said second end; said leg portion joined to said body portion adjacent said second end of said leg portion and said second end of said body portion; said central bore of said leg portion communicating with said central bore of said body portion adjacent said second end of said leg portion and said second end of said body portion;
   fastening means comprising a bolt having an externally threaded portion at a first end and an enlarged head portion with a socket therein at a second end;
   tool access means adjacent said fastening means and aligned with said socket in said second end of said fastening means to permit said fastening means to be operated from outside of said connector;
   an annular ring having a passage therethrough positioned adjacent said second end of said leg portion with said passage aligned with said central bore of said leg portion;
   said annular ring having a first annular recess in the surface defining said passage and said head portion of said bolt having a second annular recess in the outer surface of said enlarged head portion adapted to be aligned with said first annular recess;
   and locking means positionable in said first annular recess and said second annular recess to lock said bolt to said annular ring while permitting said bolt to freely rotate with respect to said annular ring, said bolt when turned in a first direction assisting in the connection of said connector to a high voltage terminal, and when turned in a second, opposite direction, assisting in the separation of said connector from a high voltage terminal.

2. A connector as defined in claim 1, wherein said locking means is a resilient, split ring.

3. A connector as defined in claim 1, wherein said tool access means comprises:
   an extension portion of resilient insulating material having a first end and a second end and a central bore extending therethrough, from said first end to said second end; said extension portion second and being joined to said leg portion second end and said extension portion central bore communicating with said central bore of said leg portion adjacent the second ends of said extension portion and said leg portion whereby a tool inserted from outside said connector can be made to engage said socket in said enlarged head portion of said bolt through said extension portion central bore and said leg portion central bore; and selectively positionable cap means which can be positioned upon said extension portion to block access to said extension portion central bore or removed from said extension portion to permit access to said extension portion central bore.

4. A connector as defined in claim 3, wherein said cap means comprises a skirt portion to engage the outer surface of said tool access means and a cylindrical probe of insulating material having an outer diameter greater than that of said central bore of said extension, said probe causing the dilation of said central bore of said extension upon the insertion of said probe when said cap means is placed upon said tool access means to tightly grip said probe and restore the insulation integrity of said insulating material of said extension portion.

5. A connector as defined in claim 1, wherein said high voltage electrical cable has a lug coupled to a first end thereof; said lug having a tab with a threaded aperture therethrough; said high voltage cable when inserted into said central bore of said body portion from said first end towards said second end of said body portion being tightly gripped by the walls of said body portion defining said body portion central bore, positioning said threaded aperture of said tab adjacent said bolt threaded portion to permit the permanent locking of said cable to said connector when said bolt is locked to said annular ring after said cable is positioned within said body portion.

6. A connector for connecting a high voltage electrical cable to a high voltage terminal comprising:

an elongate body portion of resilient insulating material having a first end and a second end and a central bore extending therethrough from said first end to said second end;

a leg portion of resilient insulating material having a first end and a second end and a central bore extending from said first end to said second end; said leg portion joined to said body portion adjacent said second end of said leg portion and said second end of said body portion; said central bore of said leg portion communicating with said central bore of said body portion adjacent said second end of said leg portion and second end of said body portion;

fastening means in said central bore of said leg portion;

tool access means adjacent said fastening means to operate said fastening means from outside of said connector; said tool access means comprising an extension portion of resilient insulating material having a first end and a second end and a central bore extending therethrough from said first end to said second end; said extension portion second end being joined to said leg portion second end and said extension portion central bore communicating with said central bore of said leg portion adjacent the second ends of said extension portion and said leg portion whereby a tool inserted from outside said connector can be made to engage said fastening means via said extension portion central bore and said leg portion central bore; and selectively positionable cap means which can be positioned upon said extension portion to block access to said extension portion central bore or removed from said extension portion to permit access to said extension portion central bore; said cap means comprising a skirt portion to engage the outer surface of said tool access means and a cylindrical probe of insulating material having an outer diameter greater than that of said central bore of said extension, said probe causing the dilation of said central bore of said extension upon the insertion of said probe when said cap means in placed upon said tool access means to tightly grip said probe and restore the insulation integrity of said insulating material of said extension portion.

7. A connector as defined in claim 6, wherein the exterior surfaces of said elongate body portion and said leg portion are covered with a layer of resilient semi-conductive material to provide a shield for said connector and the skirt portion of said cap means is fabricated of resilient semi-conductive means to complete the shield about said extension portion when positioned upon said extension portion.

8. A connector for connecting a high voltage electrical cable to a high voltage terminal comprising:

an elongate body portion of resilient insulating material having a first end and a second end and a central bore extending therethrough from said first end to said second end;

a leg portion of resilient insulating material having a first end and a second end and a central bore extending from said first end to said second end; said leg portion joined to said body portion adjacent said second end of said leg portion and said second end of said body portion; said central bore of said leg portion communicating with said central bore of said body portion adjacent said second end of said leg portion and said second end of said body portion;

fastening means in said central bore of said leg portion; said fastening means being a bolt having an externally threaded portion at a first end and an enlarged head portion with a socket therein at a second end;

tool access means adjacent said fastening means to operate said fastening means from outside of said connector; said tool access means comprising an extension portion of resilient insulating material having a first end and a second end and a central bore extending therethrough from said first end to said second end; said extension portion second and being joined to said leg portion second end and said extension portion central bore communicating with said central bore of said leg portion adjacent the second ends of said extension portion and said leg portion whereby a tool inserted from outside said connector can be made to engage said fastening means via said extension portion central bore and said leg portion central bore; and selectively positionable cap means which can be positioned upon said extension portion to block access to said extension portion central bore or removed from said extension portion to permit access to said extension portion central bore; said cap means comprising a skirt portion to engage the outer surface of said tool access means and a cylindrical probe of insulating material having an outer diameter greater than that of said central bore of said extension, said probe causing the dilation of said central bore of said extension upon the insertion of said probe when said cap means is placed upon said tool access means to tightly grip said probe and restore the insulation integrity of said insulating material of said extension portion.

* * * * *

UNITED STATES PATENT AND TRADEMARK OFFICE
CERTIFICATE OF CORRECTION

PATENT NO.  : 5,114,357

DATED       : May 19, 1992

INVENTOR(S) : Luzzi

Figure 1:
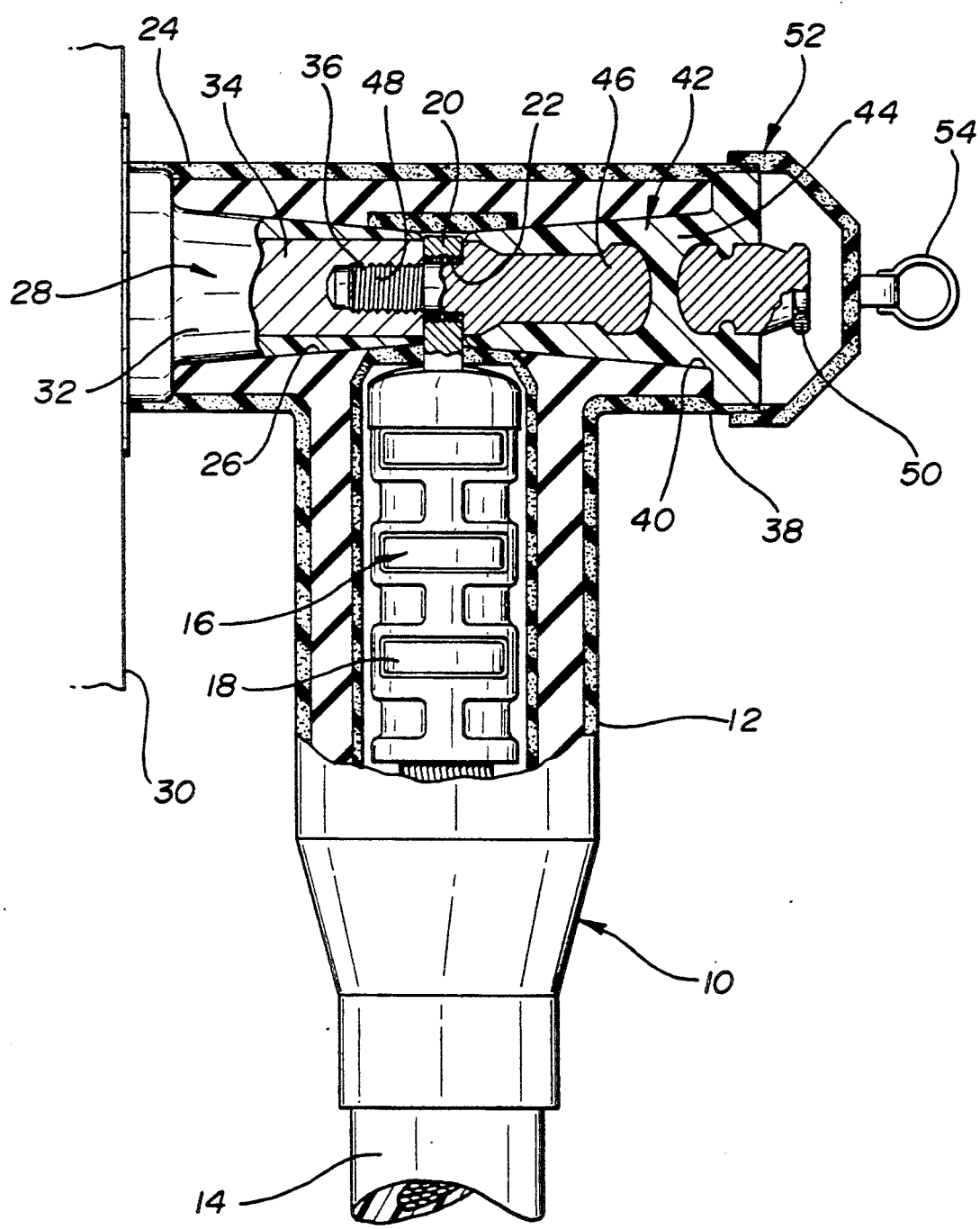
FIG. 1 is a side elevation, partly in section, of a cable connector for coupling a high voltage electrical cable to a high voltage terminal according to the prior art.

It is certified that error appears in the above-identified patent and that said Letters Patent is hereby corrected as shown below:

```
Column 1, line 16, "FIG." should read --FIG. 1.--.
Column 3, line 57, "17"   should read --117--.
Column 4, line 4,  "12"   should read --112--.
Column 4, line 34, "!86"  should read --186--.
Column 5, line 65, "connector connecting" should read --connector for
                   connecting--.
Column 5, line 68, "second and" should read --second end and--.
Col. 8, line 38,   "second and" should read --second end--.
```

Signed and Sealed this

Twenty-fourth Day of August, 1993

Attest:

BRUCE LEHMAN

Attesting Officer

Commissioner of Patents and Trademarks